(12) United States Patent
Shibata

(10) Patent No.: US 6,349,112 B1
(45) Date of Patent: Feb. 19, 2002

(54) ADAPTIVE EQUALIZER COMPENSATING SIGNAL DISTORTION ON TRANSMISSION PATH

(75) Inventor: Takayuki Shibata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/413,685

(22) Filed: Oct. 7, 1999

(30) Foreign Application Priority Data

Oct. 13, 1998 (JP) ............................................. 10-290628

(51) Int. Cl.[7] .............................................. H03K 5/159
(52) U.S. Cl. ....................... 375/232; 375/233; 375/346; 375/350; 708/322; 708/323
(58) Field of Search ................................. 375/229, 230, 375/231, 232, 233, 340, 341, 346, 350; 708/319, 322, 323

(56) References Cited

U.S. PATENT DOCUMENTS

| 5,345,452 A | * | 9/1994 | Matui | 371/43 |
| 5,513,215 A | * | 4/1996 | Marchetto et al. | 375/233 |
| 5,870,433 A | * | 2/1999 | Huber et al. | 375/233 |

FOREIGN PATENT DOCUMENTS

| JP | 5-152893 | 6/1993 |
| JP | 5-152894 | 6/1993 |
| JP | 5-292138 | 11/1993 |
| JP | 5-292139 | 11/1993 |
| JP | 6-216710 | 8/1994 |
| JP | 11-8573 | 1/1999 |

OTHER PUBLICATIONS

Horigoe, "Waveform Equalization Technique for Digital Mobile Communication", *TRICEPS*, pp. 33–45 and 77–92.

H. Matsui, "Delayed Decision Feedback Sequence Estimation for GMSK Wireless ATM Modem", *NEC Research and Development*, Jan. 1997, pp. 74–80.

* cited by examiner

*Primary Examiner*—Stephen Chin
*Assistant Examiner*—Dac V. Ha
(74) *Attorney, Agent, or Firm*—Ostrolenk, Faber, Gerb & Soffen, LLP

(57) ABSTRACT

An adaptive equalizer includes an impulse response detecting section, a region specifying section, an adaptive control section and a delayed decision feedback sequence estimating section. The impulse response detecting section detects an impulse response of a transmission path from a training signal. A reception signal includes the training signal and a data signal following the training signal. The region specifying section outputs a region specifying signal used to specify a sequence estimation region and an adaptive control region of the detected impulse response. The adaptive control section updates the detected impulse response using an adaptive algorithm based on the data signal and an estimation result, and outputs the updated impulse response for the determined sequence estimation region. The delayed decision feedback sequence estimating section performs a sequence estimation based on the updated impulse response for the determined sequence estimation region and the data signal to produce the estimation result, and outputs the estimation result to the adaptive control section.

19 Claims, 3 Drawing Sheets

ADAPTIVE EQUALIZER COMPENSATING SIGNAL DISTORTION ON TRANSMISSION PATH

BACKGROUND OF THE INVENTION

1. Field of the Invention

The present invention relates to an adaptive equalizer, and more particularly to an adaptive equalizer which can compensate a signal distortion on a transmission path and which uses a delayed decision feedback sequence estimator.

2. Description of the Related Art

Generally, in a digital mobile communication, interference occurs between signal codes on a transmission path due to multi-path. The interference is a factor of transmission performance degradation. As one effectual measure to compensate the interference between the signal codes, equalizers of various types are used such as a maximum likelihood sequence estimation (MLSE) type.

In the digital mobile communication, the transmission path characteristic changes every moment in accordance with the movement of a mobile station. It is an adaptive equalizer that updates an impulse response of the transmission path in accordance with the transmission path characteristic change. At this time, various algorithms such as a least mean square (LMS) algorithm and a recursive least square (RLS) are used as the adaptive algorithm. It should be noted that the maximum likelihood sequence estimation is described by Horikoshi in "Waveform Equalization Technique for Digital Mobile Communication" (pp. 77–92, published from TRICEPS). Also, the adaptive algorithm such as the LMS algorithm is described on pages 33–45 in the same publication.

Conventionally, an adaptive equalizer using the adaptive maximum likelihood sequence estimation is disclosed in Japanese Laid Open Patent Applications (JP-A-Heisei 5-152893 and JP-A-Heisei 5-152894). FIG. 1 shows a system employing a conventional adaptive equalizer. Referring to FIG. 1, after a reception signal is temporarily stored in a memory 60, the reception signal is supplied to a Viterbi algorithm processing section 70 through a matched filter 61. The Viterbi algorithm processing section 70 carries out the maximum likelihood sequence estimation to the reception signal and outputs an estimation result. It should be noted that the reception signal has a frame format shown in FIG. 3 and is composed of a known training signal and an unknown data signal.

An impulse response of a transmission path is used in the maximum likelihood sequence estimation by a transmission path estimating section 80. When the reception signal is supplied from the memory 60, the transmission path estimating section 80 first determines initial values by use of an adaptive algorithm such that a difference is made small between the reception signal and a replica signal. The replica signal is obtained by convoluting at the receiving end a training signal having a predetermined known value and an impulse response during the reception of the training signal. Also, the transmission path estimating section 80 updates the initial values during the reception of the data signal by use of the adaptive algorithm. The adaptive algorithm functions such that a difference is made small between the reception signal and the replica signal obtained by convoluting the impulse response and the estimation result from the Viterbi algorithm processing section 70.

The training signal or the estimation result from the Viterbi algorithm processing section 70 are multiplied with the impulse response components $h_{0n}$ to $h_{Ln}$ by multipliers 82-0 to 82-L through delay elements 81-0 to 81-(L−1). The outputs of the multipliers 82-0 to 82-L are added by an adder 83. The output of the adder 83 is the replica signal to imitate the reception signal. An error signal is determined by an adder 84 to indicate a difference between the replica signal and the reception signal. A calculating section 85 calculates impulse response estimation values {Ehj} (j=0, . . . , L) using the error signal based on the adaptive algorithm and outputs them to the matched filter 61 and the Viterbi algorithm processing section 70.

In the above conventional example, the calculating section 85 uses the least mean square algorithm having the function to estimate a plurality of impulse response components using a plurality of parameter correction coefficients. A calculating section 71 has the function to determine optimal correction coefficients based on pathmetric result obtained as the result of the maximum likelihood sequence estimation using the plurality of impulse response components.

By the way, the maximum likelihood sequence estimation type equalizer is an equalizer having the highest ability. However, there is a drawback in a large circuit scale, i.e., it is very calculation-intensive. Therefore, the development of the equalizer is carried forward to reduce a circuit scale without degrading the equalization ability. As one example, there is an equalizer using a delayed decision feedback sequence estimator (DDFSE) in which the maximum likelihood sequence estimator and a decision feedback equalizer (DFE) are combined. Such a delayed decision feedback sequence estimator is described in "NEC Research and Development" (January, 1997, pp. 74–80).

An example of the delayed decision feedback sequence estimation reception apparatus is described in Japanese Patent Application No. Heisei9-158172 (reference 2: corresponding to Japanese Laid Open Patent Application (JP-A-Heisei 11-8573) opened on Jan. 12, 1999).

FIG. 2 shows a schematic structure of the reference 2. Referring to FIG. 2, when a reception signal is supplied, an impulse response is determined by a transmission path characteristic detector 41 during the reception of a training signal. Also, the amplitudes of the impulse response components are determined by an absolute value calculating unit 42. A summing unit 43 classifies impulse response components into a maximum likelihood sequence estimation region, a decision feedback equalization region and an outside region other than the maximum likelihood sequence estimation region and the decision feedback equalization region. Also, the summing unit 43 determines summations (p, q and r) of the amplitude values for each region. After that, the summing unit 43 calculates the summations p, q and r one after another while shifting each region, to output to a maximum value detector 44. The maximum value detector 44 carries out the calculation of $P/(R+\alpha Q)$ and outputs timings corresponding to the maximum calculation result to a delayed decision feedback sequence estimator 45 (In this example, $\alpha=1/7$, and the values P, Q and R are the same as defined above).

The delayed decision feedback sequence estimator 45 determines a maximum likelihood sequence estimation region and a decision feedback equalization region of the impulse response components supplied from transmission path characteristic detector 41 in response to the timing signals which are supplied from the maximum value detector 44. The delayed decision feedback sequence estimator 45 carries out a sequence estimation using the impulse response components in those regions, and outputs as the maximum likelihood estimation data.

Next, calculation for determining the optimal region of the impulse response components in the maximum value detector 44 will be described.

All the components of the decision feedback equalization region are ideally canceled through the feedback operation, and do not contribute to improvement or degradation of the estimation ability of the sequence estimator. Therefore, the estimation ability is determined based on the ratio P/R of the components of the maximum likelihood sequence estimation region to the components of the outside region. When the ratio is larger, the estimation ability is higher.

However, the decision feedback equalization region cannot be completely canceled due to errors such as a quantization error so that a component is left as a residual distortion. Therefore, it is possible to say that the estimation ability is higher when the ratio of the components of the maximum likelihood sequence estimation region to the addition of the components of the outside region and the components of the decision feedback equalization region which is weighted by a coefficient α is larger. That is, the timing when the above-mentioned P/(R+αQ) becomes maximum indicates the optimal sequence estimation region.

In the above Japanese Patent Application No. (Heisei 9-158172), it is described that the calculation to determine such an optimal sequence estimation region is carried out using a simple algorithm in the delayed decision feedback sequence estimator. Thus, the apparatus is made small in size and is reduced in power consumption.

By the way, it is possible to realize an adaptive equalizer with the structure like an adaptive maximum likelihood sequence estimator, if the impulse response components are updated using an adaptive algorithm even in the conventional delayed decision feedback sequence estimator. However, in such an adaptive delayed decision feedback sequence estimator, there is a problem in that the estimation characteristic is deteriorated, depending on the waveform of the impulse response of the transmission path, when the adaptive control is carried out.

FIG. 4 shows an example of an impulse response of the transmission path and the sequence estimation region. Referring to FIG. 4, this example is a 2-wave model in which the maximum likelihood sequence estimation region has 3-symbol length, and the decision feedback equalization region has 3-symbol length. Also, there is a direct wave and a delayed wave with a 4-T (T: symbol period) delay time. There is a case that the level of the direct wave becomes low remarkably due to fading in an actual environment, as shown in FIG. 4. In such a case, the maximum likelihood sequence estimation region is set to contain delayed wave components based on the above-mentioned calculation for determining the sequence estimation region. Thus, the direct wave component is outside the estimation region.

In this way, the delayed decision feedback sequence estimator has the feature in the following point. That is, even when the direct wave and all the delayed wave components fall within the sequence estimation region (6 symbol length in the case), the sequence estimation region is set such that a part of the impulse response components is outside the estimation region.

When a mobile station does not move, the transmission path characteristic changes hardly. In such a situation, a good estimation result can be obtained in the delayed decision feedback sequence estimator, in case where the maximum likelihood sequence estimation is carried out using the delayed wave components with higher levels shown in FIG. 4, rather than a case where the direct wave components with lower levels are used. However, when the adaptive equalization is carried out, the direct wave components out of the estimation region are not reflected to a generated replica signal. Therefore, the direct wave components are contained in the error signal between the replica signal and the reception signal, just as it is. The impulse response components are updated as if the transmission path characteristic changes in spite that the error signal is not generated due to the change of the transmission path characteristic. As a result, the impulse response has no relation with the correct transmission path characteristic so that the estimated characteristic is deteriorated. In other words, in the delayed decision feedback sequence estimator, a region has been set to contain a lot of impulse response components in the maximum likelihood sequence estimation region of the sequence estimation region. Because this is always not the setting to contain a lot of impulse response components in the sequence estimation region, the reliability of the adaptive control replica signal which is generated using the impulse response components in this region become low. As a result, an erroneous adaptive control is carried out and the estimation characteristic has deteriorated.

In conjunction with the above description, a maximum likelihood sequence estimating receiver is described in Japanese laid Open Patent Applications (JP-A-Heisei 5-292138 and JP-A-Heisei 5-292139). In these references, the receiver is composed of a transversal type matched filter 5, a transmission path estimating circuit for estimating impulse responses of a transmission path, and a state estimating circuit 6 for estimating a transmission symbol sequence from the output of the matched filter based on the estimated impulse responses. The transmission path estimating circuit 9 sets a time interval to the estimated impulse response components. The time interval is determined to contain as many sample points as possible in order of the largest amplitude from among the sample points having the maximum amplitudes and to correspond to the number of taps of the matched filter 5. The setting of tap coefficients of the matched filter 5 and the estimation of the transmission symbol sequence in the state estimating circuit 6 are carried out based on only the sample points within the time interval. Thus, impulse response components of the optimum transmission path having the length of NT can be estimated by comparing the signal amplitudes with each other without calculating a summation of squares of signal amplitudes. Alternatively, the time interval is determined to contain as many sample points having amplitudes higher than a predetermined value as possible in order of the largest amplitude from among the sample points having the maximum amplitudes and to correspond to the number of taps of the matched filter 5.

Also, an adaptive equalizer is described in the above Japanese Laid Open Patent Applications (JP-A-Heisei 5-152893 and JP-A-Heisei 5-152894). In these references, the adaptive equalizer carries out an adaptive control based on a maximum likelihood sequence estimating method using a least mean square adaptive algorithm or a recursive least square adaptive algorithm for impulse response estimation of a transmission path. The maximum likelihood sequence estimations are carried out using parameter correction coefficients of the least mean square adaptive algorithms different from each other or forgetting coefficients of the recursive least square adaptive algorithms different from each other for a data or control information symbol interval to one time slot or a plurality of symbols. An estimated value of the transmission symbol sequence is outputted in which the maximum value of pathmetric calculated by a Viterbi algorithm processing section 70 is maximum. Alternatively, the estimation value of the transmission symbol sequence is outputted in which a summation of squares of the outputs of an adder 84 of the transmission path estimating section 80, i.e., a transmission estimation error of the transmission path estimating section 80, for every symbol has a minimum.

Also, an adaptive equalizer is described in Japanese Laid Open Patent Application (JP-A-Heisei 6-216710). In the reference, the adaptive equalizer is composed of an equalizing filter section including delay circuits with taps, a data determining section (12), a tap coefficient updating circuit (23), and a correction signal generating circuit (24) for generating a correction signal based on a reference signal (an output data from the data determining section 12 or a known signal sequence) and a resultant estimation output value determined from the tap coefficients after the update and an input signal of the equalizing filter section used after the update.

SUMMARY OF THE INVENTION

Therefore, an object of the present invention is to provide an adaptive equalizer using a delayed decision feedback sequence estimator to have a high equalization ability while the deterioration of estimation characteristic due to an impulse response of a transmission path is suppressed.

In order to achieve an aspect of the present invention, an adaptive equalizer includes an impulse response detecting section, a region specifying section, an adaptive control section and a delayed decision feedback sequence estimating section. The impulse response detecting section detects an impulse response of a transmission path from a training signal. A reception signal includes the training signal and a data signal following the training signal. The region specifying section outputs a region specifying signal used to specify a sequence estimation region and an adaptive control region of the detected impulse response. The adaptive control section updates the detected impulse response using an adaptive algorithm based on the data signal and an estimation result, and outputs the updated impulse response for the determined sequence estimation region. The delayed decision feedback sequence estimating section performs a sequence estimation based on the updated impulse response for the determined sequence estimation region and the data signal to produce the estimation result, and outputs the estimation result to the adaptive control section.

The region specifying section specifies a region where $P/(R+\alpha Q)$ becomes maximum, as the sequence estimation region, and a region where $(P+Q)/R$ become maximum, as the adaptive control region, where P is a power component of in a maximum likelihood sequence estimation region, Q is a power component of a decision feedback equalization region, R is a power component of a region out of the maximum likelihood sequence estimation region and the decision feedback equalization region, and $\alpha$ is an optional value.

Also, the adaptive control section includes a replica signal generating section, an error signal generating section and an impulse response updating section. The replica signal generating section generates a replica signal in response to the estimation result and the updated impulse response for the determined adaptive control region. The error signal generating section generates an error signal from the data signal and the replica signal. The impulse response updating section updates the updated impulse response using the adaptive algorithm based on the data signal and the estimation result, and outputs the updated impulse response for the determined sequence estimation region. In this case, the error signal generating section includes a delay section and a subtracting section. The delay section delays the data signal by a predetermined delay quantity to produce a delay signal. The subtracting section generates the error signal corresponding to a difference between the delay signal and the replica signal. Also, the impulse response updating section further sets the delay quantity to the output variable delay section based on a determination delay of delayed decision feedback sequence estimation and a time difference between the sequence estimation region and the adaptive control region.

Also, the replica signal generating section includes a transversal filter which convolutes impulse response for the adaptive control region and the estimation result to generate the replica signal.

In order to achieve another aspect of the present invention, a method of compensating a transmission path distortion, includes:

setting and holding an initial impulse response, a sequence estimation region and an adaptive control region of the detected impulse response based on a training signal, a reception signal including the training signal and a data signal following the training signal;

performing a sequence estimation based on the held impulse response for the held sequence estimation region and the data signal to produce a estimation result;

updating and holding the held impulse response using an adaptive algorithm based on the data signal and the estimation result.

An impulse response of a transmission path is detected from a training signal to set the detected impulse response as the initial impulse response, and the sequence estimation region and the adaptive control region is determined based on the initial impulse response.

In the determining, a region where $P/(R+\alpha Q)$ becomes maximum, as the held sequence estimation region, and a region where $(P+Q)/R$ become maximum, as the held adaptive control region are determined, where P is a power component of in a maximum likelihood sequence estimation region, Q is a power component of a decision feedback equalization region, R is a power component of a region out of the maximum likelihood sequence estimation region and the decision feedback equalization region, and $\alpha$ is an optional value.

Also, in the determining, a replica signal is generated in response to the estimation result and the held impulse response for the determined adaptive control region. An error signal is generated from the data signal and the replica signal. The held impulse response is updated using the adaptive algorithm based on the data signal and the estimation result.

In the generating an error signal, the data signal is delayed by a predetermined delay quantity to produce a delay signal. The error signal corresponding to a difference between the delay signal and the replica signal is generated. In this case, in the updating, the delay quantity is predetermined based on a determination delay of delayed decision feedback sequence estimation and a time difference between the sequence estimation region and the adaptive control region.

Also, in the generating a replica signal, the held impulse response for the held adaptive control region and the estimation result are convoluted to generate the replica signal.

In order to achieve still another aspect of the present invention, an adaptive equalizer, includes a delayed decision feedback type sequence estimator, a replica generating unit, an error signal generating unit and an impulse response updating section unit. The delayed decision feedback type sequence estimator performs a sequence estimation based on a held impulse response for a held sequence estimation region and a data signal to produce an estimation result. A reception signal includes a training signal and the data signal following the training signal. The replica generating unit generates a replica signal in response to the estimation result and the held impulse response for a held adaptive control region. The error signal generating unit generates an error signal from the data signal and the replica signal. The impulse response updating unit updates the held impulse response using an adaptive algorithm based on the data signal and the estimation result, and outputs the held impulse response for the held sequence estimation region to the delayed decision feedback type sequence estimator.

The adaptive equalizer may further include an impulse response detector and a region specifying section. The impulse response detector extracts an impulse response of a transmission path from the training signal to set the detected impulse response as the held impulse response in the impulse response updating unit. The region specifying unit determines the sequence estimation region and the initial adaptive control region based on the impulse response to set the sequence estimation region and the adaptive control region in the impulse response updating section.

Also, the region specifying unit determines a region where $P/(R+\alpha Q)$ becomes maximum, as the held sequence estimation region, and a region where $(P\&Q)/R$ becomes maximum, as the held adaptive control region, where P is a power component of a maximum likelihood sequence estimation region, Q is a power component of a decision feedback equalization region, R is a power component of a region out of the maximum likelihood sequence estimation region and the decision feedback equalization region, and $\alpha$ is an optional value.

The error signal generating unit includes a delay unit which delays the data signal by a predetermined delay quantity to produce a delay signal, and an adder generating the error signal corresponding to a difference between the delay signal and the replica signal. In this case, the impulse response updating unit updates the held impulse response using the algorithm based on the error signal and the estimation result.

Also, the impulse response updating sets the predetermining delay quantity based on a determination delay of delayed decision feedback sequence estimation and a time difference between the sequence estimation region and the adaptive control region.

Also, the replica generating unit includes a transversal filter convoluting the held impulse response for the held adaptive control region and the estimation result to generate the replica signal.

DESCRIPTION OF THE PREFERRED EMBODIMENTS

Hereinafter, an adaptive equalizer of the present invention will be described below in detail with reference to the attached drawings.

Figure 5:
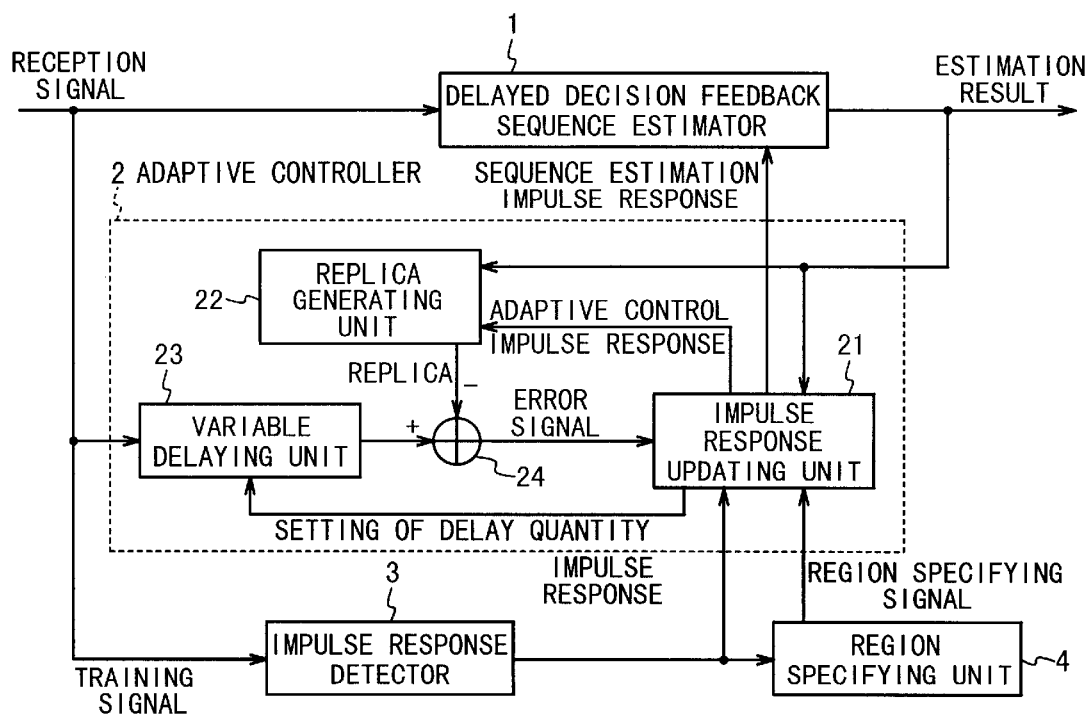
FIG. 5 is a block diagram showing an adaptive equalizer of the present invention.

Referring to FIG. 5, the adaptive equalizer of the present invention is composed of a delayed decision feedback sequence estimator 1, and adaptive controller 2, an impulse response detector 3 and a region specifying unit 4. The adaptive controller 2 is composed of a variable delaying unit 23, an adder 24, a replica generating unit 22, and an impulse response updating unit 21.

The impulse response detector 3 detects an impulse response of a transmission path from a training signal of a reception signal. The impulse response detector 3 sets the detected impulse response to the impulse response updating unit 21 as an initial impulse response. The region specifying unit 4 specifies regions of the impulse response for a sequence estimation and an adaptive control. The region specifying unit 4 sets the sequence estimation region and the adaptive control region to the impulse response updating unit 21 in the form of a region specifying signal as a sequence estimation region and an adaptive control region.

The delayed decision feedback sequence estimator 1 carries out a sequence estimation using the impulse response for the sequence estimation region which is held in the impulse response updating unit 21. The adaptive control unit 2 generates a replica signal using an adaptive algorithm based on the estimation result from the delayed decision feedback sequence estimator 1 and the impulse response for the adaptive control region, and updates the impulse response.

In more detailed, the replica signal generating unit 22 generates the replica signal for a convolution adaptive control from the estimation result of the delayed decision feedback sequence estimator 1 and the impulse response for the adaptive control region which is held in the impulse response updating unit 21. The variable delay unit 23 delays a data signal of the reception signal until the estimation result is obtained from the delayed decision feedback sequence estimator 1 for the necessary number. The adder 24 outputs an error signal corresponding to a difference between the replica signal and the data signal delayed by the variable delay unit 23.

The impulse response updating unit 21 holds the regions specified by the region specifying unit 4 as the sequence estimation region and the adaptive control region. The impulse response for the sequence estimation region is supplied to the delayed decision feedback sequence estimator 1.

Also, the impulse response updating unit 21 sets a required delay quantity to the variable delay unit 23 based on a determination delay of delayed decision feedback sequence estimation and a difference between the held sequence estimation region and the held adaptive control region.

Also, the impulse response updating unit 21 updates and holds the impulse response based on the error signal and the estimation result from the delayed decision feedback sequence estimator 1 by use of the adaptive algorithm.

In addition, the impulse response updating unit 21 outputs the held impulse response for the adaptive control region to the replica signal generating unit 22 and outputs the impulse response for the sequence estimation region to the delayed decision feedback sequence estimator 1.

Next, the operation of the adaptive equalizer will be described in detail with reference to FIG. 5.

Figure 2:
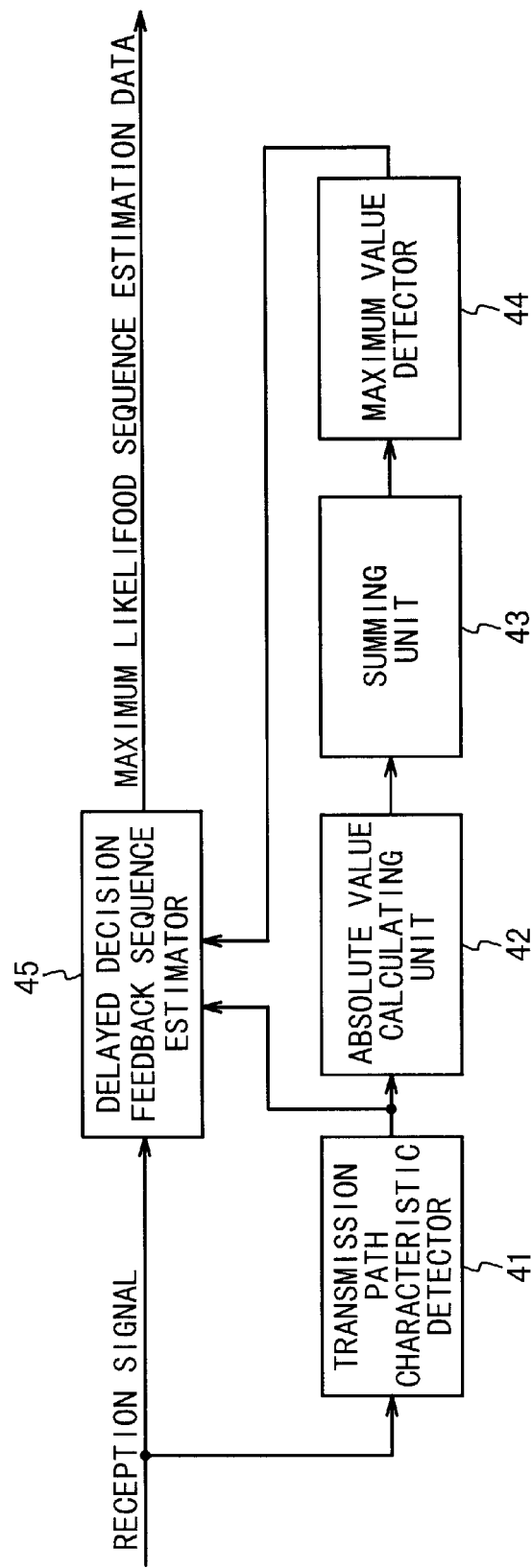
FIG. 2 is a block diagram showing a conventional delayed decision feedback sequence estimation receiver.
Figure 3:
FIG. 3 is a diagram showing an example of a frame format.

During the training signal reception shown in FIG. 3, the impulse response detector 3 detects impulse response of the transmission path. The impulse response detector 3 has a function similar to the transmission path characteristic detector 41 shown in FIG. 2 and detects the impulse response through the correlation calculation with a known sequence.

The optimal regions of the detected impulse response to carry out the sequence estimation and adaptive equalization are determined by the region specifying unit 4. The impulse response for the sequence estimation region is determined as in the conventional delayed decision feedback sequence estimator. In other words, a power component P of the maximum likelihood sequence estimation region, a power component Q of the decision feedback equalization region, and a power component R outside the above two regions are determined and a region having the maximum value of $P/(R+\alpha Q)$ is set.

Figure 4:
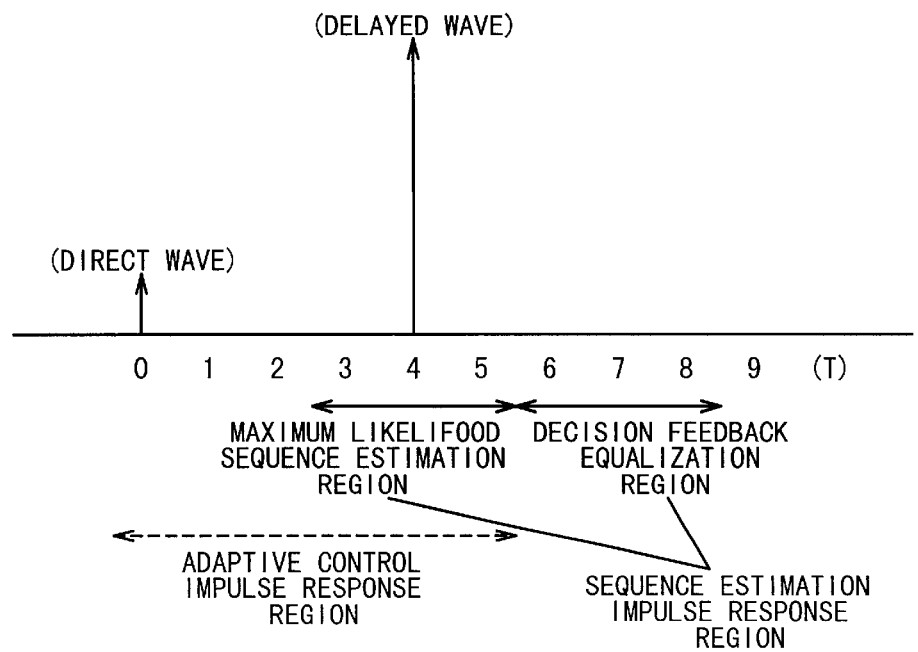
FIG. 4 is a diagram showing an example of impulse response components of a transmission path.

On the other hand, the impulse response for the adaptive control region is sets as the region having the maximum value of $(P+Q)/R$ to contain a lot of power components in its region. It should be noted that in order to avoid division by zero, if a denominator is smaller than an optional value $\beta$, the denominator is set to value $\beta$ in the above case. The both regions sometimes becomes identical. However, when the impulse response waveforms are like FIG. 4, different regions are specified. In this case, the sequence estimation region and the adaptive control region are set as shown in FIG. 4, for example.

The impulse response detected by the impulse response detector 3 and the region specifying signal from the region specifying unit 4 are supplied to impulse response updating unit 21. Also, the impulse response held in the updating unit 21 for the sequence estimation region held in the updating unit 21 is outputted to the delayed decision feedback sequence estimator 1, and the impulse response held in the updating unit 21 for the adaptive control region held in the updating unit 21 is outputted to the replica signal generating unit 22. The impulse response out of these regions are discarded because they are never used in the subsequent process.

The impulse response updating unit 21 updates and holds the impulse response for the sequence estimation and the adaptive control by use of the adaptive algorithm like the least mean square, based on the error signal from the adder 24 and the estimation result of the delayed decision feedback sequence estimator 1. The error signal corresponds to a difference between the replica signal and the data signal, to be mentioned later. Also, the impulse response updating unit 21 outputs the held impulse response for the held sequence estimation region to the delayed decision feedback sequence estimator 1, and outputs the held impulse responses for the held adaptive control region to the replica generating section 22.

Further, the impulse response updating unit 21 determines and sets a delay quantity to the delay unit 23 based on the determination delay of delayed decision feedback sequence estimation and the determined sequence estimation region and the determined adaptive control region. The delay unit 23 delay the data signal of the reception signal by the set delay quantity until the estimation result is outputted from the delayed decision feedback sequence estimator 1. Thus, a time difference of the data signal from the replica signal is cancelled.

Moreover, when the impulse response for the adaptive control region precedes from the impulse response for the sequence estimation region, it is necessary to use a future estimation result for the replica signal generation. As a result, the delay quantity must be increased. Therefore, the impulse response updating unit 21 sets a required delay quantity to the delay unit 23 in accordance with the time difference between the sequence estimation region and the adaptive control region.

Figure 1:
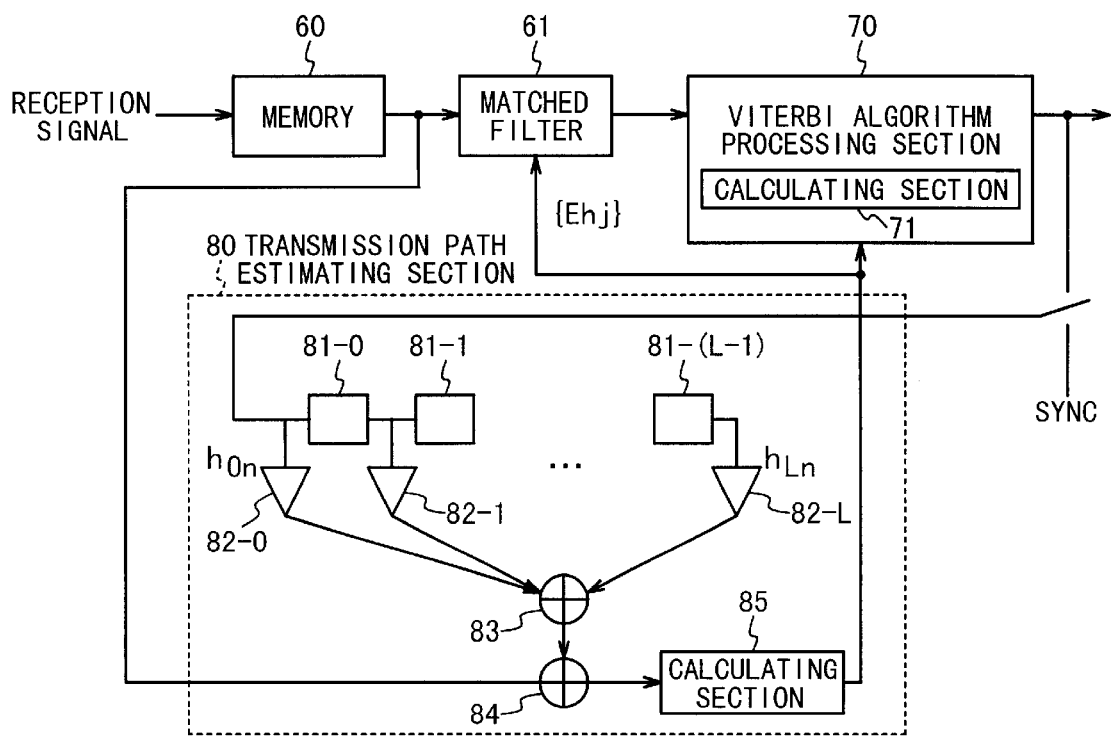
FIG. 1 is a block diagram showing a conventional adaptive equalizer which performs maximum likelihood sequence estimation.

For example, the replica signal generating unit 22 may be composed of delay elements 81-0 to 81-(L−1), multipliers 82-0 to 82-L, and an adder 83, as shown in FIG. 1. Generally, the replica signal generating section 22 is called a transversal filter. The impulse response components for the adaptive control region which are outputted form the impulse response updating unit 21 and the estimation result which is outputted from the delayed decision feedback sequence estimator 1 are convoluted to generate the replica signal for the adaptive control. The error signal between the replica signal and the data signal delayed by the delay unit 23 is determined by the adder 24. The error signal is supplied to the impulse response updating unit 21 and is processed in accordance with the adaptive algorithm.

In the present invention, the estimation result is obtained through the maximum likelihood sequence estimation using the impulse response for the sequence estimation region which has been set to contain a lot of components. Also, the impulse response for the adaptive control region is set to contain a lot of components. Thus, the estimation result and the impulse response for the adaptive control region are convoluted, and the replica signal for the adaptive control is generated to show a transmission path state more faithfully. Therefore, it is possible to say that the replica signal imitates the data signal of the reception signal in the high precision. Thus, the adaptive control can be carried out in the higher precision.

As described above, according to the present invention, the adaptive equalizer using the delayed decision feedback sequence estimator can be realized to have the high equalization ability, and to suppress the deterioration of the estimation characteristic due to the impulse response waveform of the transmission path.

What is claimed is:

1. An adaptive equalizer comprising:

an impulse response detecting unit which detects an impulse response of a transmission path from a training signal, a reception signal including said training signal and a data signal following said training signal;

a region specifying unit which outputs a region specifying signal used to specify a sequence estimation region and an adaptive control region of said detected impulse response;

an adaptive controller which updates said detected impulse response using an adaptive algorithm based on said data signal and an estimation result, and outputs said updated impulse response for said specified sequence estimation region; and a delayed decision feedback sequence estimator which performs a sequence estimation based on said updated impulse response for said determined sequence estimation region and said data signal to produce said estimation result, and outputs said estimation result to said adaptive controller.

2. An adaptive equalizer according to claim 1, wherein said region specifying unit specifies a region where $P/(R+\alpha Q)$ becomes maximum as said sequence estimation region, and a region where $(P+Q)/R$ become maximum as said adaptive control region, wherein P is a power component of a maximum likelihood sequence estimation region, Q is a power component of a decision feedback equalization region, R is a power component of a region out of said maximum likelihood sequence estimation region and said decision feedback equalization region, and $\alpha$ is an adjustable constant.

3. An adaptive equalizer according to claim 1, wherein said adaptive controller includes:
   a replica signal generating unit that generates a replica signal in response to said estimation result and said updated impulse response for said determined adaptive control region;
   an error signal generating unit that generates an error signal from said data signal and said replica signal; and
   an impulse response updating unit that updates said updated impulse response using said adaptive algorithm based on said data signal and said estimation result, and outputs said updated impulse response for said determined sequence estimation region.

4. An adaptive equalizer according to claim 3, wherein said error signal generating unit includes:
   a delay unit that delays said data signal by a predetermined delay quantity to produce a delay signal; and
   a subtractor that generates said error signal corresponding to a difference between said delay signal and said replica signal.

5. An adaptive equalizer according to claim 4, wherein said impulse response updating unit further sets said delay quantity to said output variable delay section based on a determination delay of delayed decision feedback sequence estimation and a time difference between said sequence estimation region and said adaptive control region.

6. An adaptive equalizer according to claim 3, wherein said replica signal generating unit includes a transversal filter which convolutes said adaptive control region and said estimation result to generate said replica signal.

7. A method of compensating a transmission path distortion, comprising:
   detecting an initial impulse response;
   setting and holding the initial impulse response, a sequence estimation region and an adaptive control region of said detected impulse response based on a training signal, a reception signal including said training signal and a data signal following said training signal;
   performing a sequence estimation based on said held impulse response for said held sequence estimation region and said data signal to produce an estimation result; and
   updating and holding said impulse response using an adaptive algorithm based on said data signal and said estimation result.

8. A method according to claim 7, wherein said setting includes:
   detecting an impulse response of a transmission path from a training signal to set the detected impulse response as said initial impulse response; and
   determining said sequence estimation region and said adaptive control region based on said initial impulse response.

9. A method according to claim 7, wherein said determining includes:
   determining a region where $P/(R+\alpha Q)$ becomes maximum, as said held sequence estimation region, and a region where $(P+Q)/R$ become maximum, as said held adaptive control region, wherein P is a power component of a maximum likelihood sequence estimation region, Q is a power component of a decision feedback equalization region, R is a power component of a region out of said maximum likelihood sequence estimation region and said decision feedback equalization region, and a is an optional value.

10. A method according to claim 7, wherein said updating includes:
    generating a replica signal in response to said estimation result and said held impulse response for said determined adaptive control region;
    generating an error signal from said data signal and said replica signal; and
    updating said held impulse response using said algorithm based on said data signal and said estimation result.

11. A method according to claim 10, wherein said generating an error signal includes:
    delaying said data signal by a predetermined delay quantity to produce a delay signal; and
    generating said error signal corresponding to a determination delay of delayed decision feedback sequence estimation and a difference between said delay signal and said replica signal.

12. A method according to claim 11, wherein said updating further includes:
    predetermining said delay quantity based on the determination delay of the delayed decision feedback sequence estimation and a time difference between said sequence estimation region and said adaptive control region.

13. A method according to claim 10, wherein said generating a replica signal includes:
    convoluting said held impulse response for said held adaptive control region and said estimation result to generate said replica signal.

14. An adaptive equalizer, comprising:
    a delayed decision feedback type sequence estimator that performs a sequence estimation based on a held impulse response for a held sequence estimation region and a data signal to produce an estimation result, a reception signal including a training signal and said data signal following said training signal;
    a replica signal generating unit that generates a replica signal in response to said estimation result and said held impulse response for a held adaptive control region;
    an error signal generating unit that generates an error signal from said data signal and said replica signal; and
    an impulse response updating unit that updates said adaptive control impulse response using an adaptive algorithm based on said data signal and said estimation result, and outputs said held impulse response for said held sequence estimation region to said delayed decision feedback type sequence estimator.

15. An adaptive equalizer according to claim 14, further comprising:
    an impulse response detector that detects an impulse response of a transmission path from said training signal to set the detected impulse response as said held impulse response in said impulse response updating section; and a region specifying unit that determines said sequence estimation region and said adaptive control region based on said initial impulse response to set said sequence estimation region and said adaptive control region in said impulse response updating unit.

16. An adaptive equalizer according to claim 14, wherein each of said impulse response updating unit and said region specifying unit determines a region where $P/(R+\alpha Q)$ becomes maximum as said held sequence estimation region, and a region where $(P+Q)/R$ become maximum as said held adaptive control region, wherein P is a power component of a maximum likelihood sequence estimation region, Q is a power component of a decision feedback equalization region, R is a power component of a region out of said maximum likelihood sequence estimation region and said decision feedback equalization region, and $\alpha$ is an adjustable constant.

17. An adaptive equalizer according to claim 14, wherein said error signal generating unit includes:

a delay unit that delays said data signal by a predetermined delay quantity to produce a delay signal; and an adder that generates said error signal corresponding to a difference between said delay signal and said replica signal, and wherein said impulse response updating unit updates said held impulse response using said adaptive algorithm based on said error signal and said estimation result.

18. An adaptive equalizer according to claim 17, wherein said impulse response updating unit sets said predetermining delay quantity based on a determination delay of delayed decision feedback sequence estimation and a time difference between said sequence estimation region and said adaptive control region.

19. An adaptive equalizer according to claim 14, wherein said replica signal generating unit includes:

a transversal filter convoluting said held impulse response for said held adaptive control region and said estimation result to generate said replica signal.

* * * * *